United States Patent [19]

Hertzer et al.

[11] Patent Number: 5,052,909

[45] Date of Patent: Oct. 1, 1991

[54] ENERGY-CONSERVING INJECTION MOLDING MACHINE

[75] Inventors: Ronald A. Hertzer, Milford; Edward A. Chorey; Harold J. Faig, both of Cincinnati, all of Ohio

[73] Assignee: Cincinnati Milacron Inc., Cincinnati, Ohio

[21] Appl. No.: 616,752

[22] Filed: Nov. 16, 1990

Related U.S. Application Data

[63] Continuation of Ser. No. 467,634, Jan. 19, 1990, abandoned.

[51] Int. Cl.[5] .................. B29C 45/80; B29C 45/82
[52] U.S. Cl. ..................... 425/150; 425/450.1; 425/589; 425/451.9
[58] Field of Search ............... 425/135, 150, 450.1, 425/450.9, 589

[56] References Cited

U.S. PATENT DOCUMENTS

| | | | |
|---|---|---|---|
| 3,509,600 | 5/1970 | Noble | 425/145 |
| 3,822,057 | 7/1974 | Wheeler | 425/145 |
| 4,146,601 | 3/1979 | Bishop | 425/145 |
| 4,589,830 | 5/1986 | Clawson | 425/150 |
| 4,712,991 | 12/1987 | Hehl | 425/145 |
| 4,735,564 | 4/1988 | Sasaki et al. | 425/145 |
| 4,904,913 | 2/1990 | Jones et al. | 318/560 |

OTHER PUBLICATIONS

Article: "Closed-Loop Servohydraulics: Born to Automation", Ronald A. Hertzer and Michael W. Green: Plastics Machinery & Equipment, Nov. 1988, pp. 38-39.
Brochure: "VISTA Injection Molding Machines VH Series", Cincinnati Milacron, Inc., May 1988.
VISTA HYDRAULIC USER'S MANUAL, Cincinnati Milaron, Inc., Publication PM-421-1, Oct. 1988.
Article: "IMM Power Use Cut by 70%", Plastics World, Feb. 1986, p. 15.
Paper: "A Universal Controller for Parallel Pumps with Variable Frequency Drives", P. W. Hammond, The Volume of Conference Proceedings of I.E.E.E. Industry Application Society, 17th Annual Meeting, San Francisco, Calif., Oct. 4-7, 1982.
Article: "Using Industrial Hydraulics", T. C. Frankenfield, Second Ed. 1984, pp. 6-32, 6-40 through 6-46, 10-16 through 10-20.
Unpublished Cincinnati Milacron, Inc., documents describing VISTA Hydraulic Clamp Machines, 12 sheets.
"Installation and Operation Instruction Manual", Wertec Corporation, Model 2000 and 3000 Brushless Motor Controller.
Brochure: "The Most Unique Line of Brushless Drive Systems for the Industrial World", Wertec Corporation.

*Primary Examiner*—Willard Hoag
*Attorney, Agent, or Firm*—Wood, Herron & Evans

[57] ABSTRACT

A hydraulic injection molding machine incorporates a pump driven by a variable speed motor preferably of the brushless DC type. The machine controller outputs driving signals to adjust the speed of the motor so that the flow delivered by the pump substantially matches the hydraulic demand imposed during each phase of the machine operating cycle. The pump is preferably a variable displacement type and is connected to a fast responding pump control for selectively carrying out pressure compensation or flow compensation. The values of the motor driving signals are calculated so that the motor/pump combination is operated at or near maximum efficiency except when the pump control varies the displacement of the pump to effect pressure or flow compensation. Hydraulic transient response is further improved by connecting the output of the pump to an accumulator by way of a check valve.

10 Claims, 3 Drawing Sheets

FIG. 4

ENERGY-CONSERVING INJECTION MOLDING MACHINE

This is a continuation of copending application Ser. No. 07/467,634 filed on Jan. 19, 1990, now abandoned.

FIELD OF THE INVENTION

The invention relates to hydraulic injection molding machines offering improved energy efficiency. More particularly, the present invention relates to hydraulic injection molding machines incorporating a means for adjusting the output of the hydraulic pump in accordance with the different hydraulic demands imposed by the machine during different phases of its operating cycle so that the output of the pump does not significantly exceed the imposed demand in order to conserve energy.

BACKGROUND OF THE INVENTION

Injection molding is a process for converting material from one form or shape to another by expending energy. Typically, material in the raw form of solid pellets is loaded into an injection molding machine wherein the pellets are first converted to a molten state by introducing energy in the form of heat and mechanical shear. Further energy is expended to inject the plasticized material under pressure into a mold having a cavity defining the final shape of the part to be produced while the mold is clamped forcibly closed. Additional energy is used to cool the material within the mold to return it to a solid state. The mold clamp is then opened, the molded part ejected and the mold reclosed in preparation for molding the next part. The laws of physics require that the total energy input to the molding machine equally balance the energy output.

In an hydraulic injection molding machine, energy is input to the machine in the form of electrical energy. Much of this energy is converted into hydraulic flow energy by means of an electric motor drivably connected to a hydraulic pump. The fluid delivered by the pump serves to operate various hydraulic components including electro-hydraulic control valves and hydraulic actuators. The pressure or volume flow demands for hydraulic fluid vary considerably not only from one given machine set-up to another but, also during different phases of the operating cycle of a machine in any given set-up. For instance, a set-up requiring rapid injection of the material into the mold will require a higher volume flow rate than that needed for a set-up calling for slower injection. Also, phases of the machine operating cycle such as the clamp open phase typically require greater hydraulic flows than the part curing phase. While a hydraulic injection molding machine must be capable of supplying whatever maximum fluid pressure and/or flow requirements are needed to meet the machine's maximum rated capacity, significant energy losses have been incurred when operating under conditions where lesser hydraulic fluid pressures and/or volume flow rates are required to operate the machine than the pressure and/or volume flow actually delivered by the pump.

In machines having a fixed-displacement hydraulic fluid pump driven by a fixed-speed electric motor, the pump must be driven to constantly deliver sufficient flow capable of satisfying maximum machine requirements even though the instantaneous hydraulic demand may be significantly lower. The excess flow, i.e., the difference between the actual flow delivered by the pump and the instantaneous demand, is pumped over relief valves. In doing so, energy is wasted. Some of the wasted energy is given off in the form of heat which causes undesirable heating of the hydraulic fluid itself. Further energy must be expended when the fluid temperature rises to a point where active cooling is required to restore the fluid to a suitable operating temperature. In an effort to overcome these problems, there have been various attempts in the prior art to match the output of the hydraulic pump with the demand presented by the rest of an injection molding machine.

One such attempted solution has been to provide a hydraulic injection molding machine having a fixed displacement hydraulic pump driven by an AC motor with an adjustable speed drive such as a variable frequency or inverter type drive. By varying the speed control input to the drive, the motor speed and therefore the pump delivery rate can be varied to more closely approximate the actual hydraulic demand. Unfortunately, the energy savings of such machines are realized at the expense of machine performance. Because the moving components of the motor/pump assembly cannot be accelerated or decelerated very rapidly, the frequency response of the machine is degraded. As a result, molded part quality may be adversely affected due to variations in molding parameters such as shot weight, injection velocity and injection pressure.

The assignee of the present application has marketed a line of hydraulic clamp machines under the trademark VISTA. Those machines utilize a fixed RPM AC motor to drive an axial piston, swash-plate design, variable displacement pump to insure that only the amount of flow necessary to meet load conditions is delivered by the pump thereby reducing energy usage and hydraulic fluid heating. A hydraulic feedback circuit is used to effect either pressure compensation or flow compensation of the pump output on a selectable basis by moving the angle of the swash-plate of the pump to vary its stroke. Since such control action does not require acceleration or deceleration of high inertia rotating components of the motor/pump assembly, response time is significantly improved as compared to the fixed displacement pump/variable speed AC motor machines discussed above. Further improvements in transient response are realized by connecting the pump output to a gas-charged accumulator. The output of the accumulator is connected to a multi-function servo-controlled proportional directional valve which provides closed-loop control of injection velocity, injection pressure, back pressure and melt decompression. Nevertheless, the energy savings realized in VISTA model machines has been less than the savings made possible by the present invention.

SUMMARY OF THE INVENTION

In view of the foregoing drawbacks of the prior art, it is an object of the present invention to provide an energy-conserving injection molding machine which affords greater energy savings than prior art machines while maintaining excellent response characteristics.

In accordance with a first aspect of the present invention, an energy-conserving injection molding machine which includes a hydraulic pump driven by a brushless DC motor is provided. Such a motor affords a considerable advantage in energy efficiency as compared to the variable speed AC pump motors of the prior art.

In accordance with a second aspect of the invention, a variable speed motor, preferably of the brushless DC type, is used to drive a variable displacement hydraulic pump. The electronic machine controller delivers a driving signal to the motor drive to adjust the motor speed in accordance with desired molding parameters. The motor speed is selected to substantially match the output of the pump to the hydraulic load expected during a particular phase of the machine operating cycle given the molding parameters entered into the controller by an operator. The controller automatically outputs new driving signals as the machine cycles through phases of operation characterized by different hydraulic loads. The displacement of the pump is governed by a pump control which selectively regulates the flow delivered by the pump in either a pressure compensation or flow compensation mode. The pump control is capable of responding to load changes quickly and therefore provides improved transient response. To further improve transient response, the pump output is connected to a gas-charged accumulator by way of a check valve. These and other aspects and advantages of the present invention will be apparent to persons of ordinary skill in the art in view of the following detailed description taken in conjunction with the drawings wherein like reference numerals designate like items.

DETAILED DESCRIPTION OF THE PREFERRED EMBODIMENT

Figure 1:
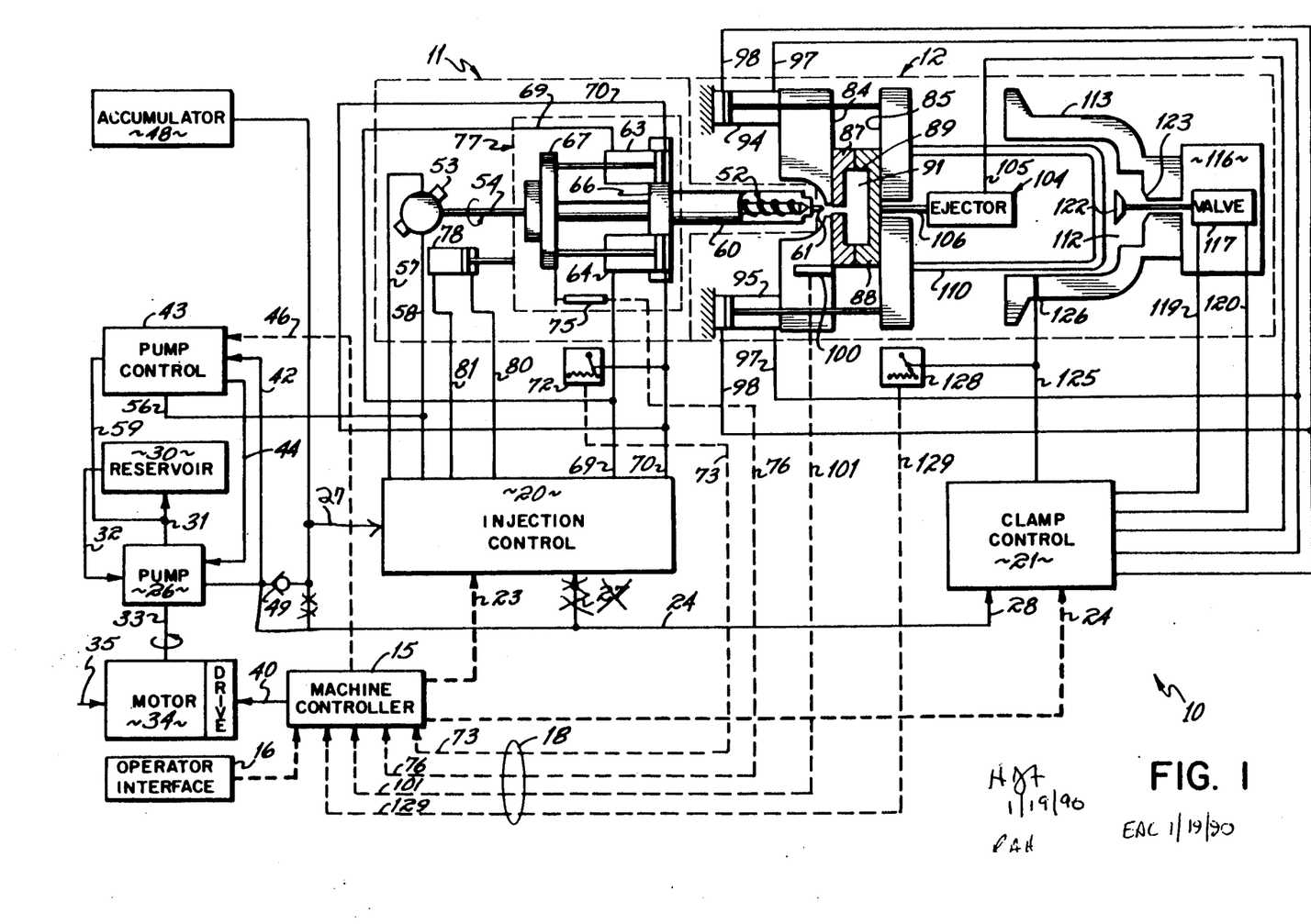
FIG. 1 is a schematic diagram of an injection molding machine constructed in accordance with the present invention.

FIG. 1 illustrates a preferred embodiment of an injection molding machine 10 constructed in accordance with the present invention. Machine 10 includes an injection unit 11 juxtaposed a clamping unit 12. The sequence, timing and quantitative values associated with the various operations performed by injection unit 11 and clamping unit 12 are carried out under the direction of an electronic machine controller 15 in accordance with molding parameters entered into controller 15 by an operator through an operator interface 16. Closed-loop control is facilitated by a plurality of feedback signals 18 which controller 15 receives from injection unit 11 and clamping unit 12. Injection control 20 and clamp control 21 serve as electro-hydraulic interfaces between machine controller 15 and injection unit 11 and clamping unit 12, respectively. Injection control 20 and clamp control 21 are well known in the art and comprise electrically controlled proportioning valves and other hydraulic and electro-hydraulic devices arranged for generating the hydraulic pressures and/or flows necessary for operating injection and clamping unit 12 in accordance with various operating signals received from machine controller by way of respective multiple signal paths 23 and 24, respectively.

Hydraulic fluid is supplied to injection control 20 and clamp control 21 from a pump 26 by way of manifolds 27 and 28. Pump 26 communicates with a reservoir 30 by way of a case drain line 31 and a supply line 32 and is driven by an electric motor 34 which receives electrical input energy at 35. Preferably, motor 34 comprises a variable speed brushless DC motor but, in accordance with certain aspects of the invention, may also suitably comprise other variable speed motors either AC or DC. Motor 34 is mechanically connected to pump 26 by way of a rotatable shaft 33. In order to conserve energy by matching the hydraulic output of pump 26 to the demand during different phases of the operating cycle of machine 10, the invention contemplates controlling the speed of motor 34 and shaft 33, and thus the output of pump 26, with a driving signal 40 generated by machine controller 15 in a manner to be described in further detail hereinafter. For present purposes it is sufficient to note that machine controller 15 calculates the magnitude of driving signal 40 for each phase of the operating cycle of machine 10 from the particular molding parameters entered by an operator through operator interface 16 during the setup of machine 10. The molding parameters determine the hydraulic demand expected during each phase of the machine cycle.

The hydraulic flow delivered by pump 26 is monitored, via a line 42, by a pump control 43. Pump control 43, which will be described in further detail with reference to FIG. 3, communicates with pump 26 via a line 44 to operate pump 26 to operate in either a pressure compensation mode or a flow compensation mode in accordance with an electrical pressure or flow compensation signal delivered to pump control 43 from machine controller 15 by way of a signal path 46. In order to improve hydraulic transient response, the output of pump 26 which supplies manifolds 27 and 28 is preferably connected to a gas-charged accumulator 48 through a check valve 49.

Accumulator 48 has a ballast charged at an initial internal pressure that resists the flow of liquid into its interior. The design of such accumulators is well known within the art. When the pressure in the line to which accumulator 48 is attached exceeds the internal pressure of the accumulator, hydraulic fluid will flow into accumulator 48 compressing the ballast. When the line pressure drops below the internal pressure of the accumulator, hydraulic fluid will flow from accumulator 48 into the line. Thus, if pump 26 and motor 34 lag behind the demand for flow rate created by valves opening in one of the control circuits 20 or 21, accumulator 48 rapidly responds to temporarily make up the additional demand. Thus, accumulator 48 provides more precise and faster-responding matching of flow delivery with flow demand.

Injection unit 11 includes an injection screw 52 that is rotatably coupled to a hydraulic extruder motor 53 by way of a shaft 54. The rotational direction and speed of motor 53 and thus, those of screw 52 are governed by the hydraulic flow directed to motor 53 from injection control 20 by way of a pair of hydraulic lines 57 and 58. In order to sense the hydraulic flow to extruder motor 53 during the "extruder run" phase of the machine operating cycle, line 58, which emanates from the output side of an electrically controlled throttle (not shown) located within injection control 20, is connected to pump control 43 by way of a line 56. The purpose of the latter connection will be made clear in connection with the description of pump control 43 with reference to FIG. 3 hereinafter.

Injection screw 52 is housed within a barrel 60 having a nozzle end 61. Barrel 60 communicates with a hopper (not shown) which may be filled with a moldable material usually in the form of solid pellets or granules. As screw 52 rotates in one direction within barrel 60, the barrel is filled with the material which is transformed into a molten plastic state by the mechanical shearing action of screw 52. Plasticizing of the molding material may be assisted by one or more electric heaters (not shown) mounted in thermal contact with barrel 60. As moldable material accumulates within barrel 60 from its nozzle end 61 rearwardly (to the left in FIG. 1), screw 52 is forced axially rearwardly within barrel 60.

Screw 52 may be selectively extended or retracted within barrel 60 at a desired rate by means of a pair of hydraulic actuators 63 and 64 which are operably mounted between a fixed platen 66 and a platen 67 mounted for axial movement relative platen 66. Actuators 63 and 64 communicate hydraulically with injection control 20 by way of a pair of lines 69 and 70 which, when pressurized, cause screw 52 to retract and extend, respectively, within barrel 52. To monitor the pressure under which screw 52 is extended, a pressure transducer 72 connected to line 70 sends a feedback signal to machine controller 15 by way of a signal path 73. The axial position of screw 52 within barrel 60 as well as its rate of travel are monitored using a distance transducer 75 connected in distance sensing relation to movable platen 67 and communicating with machine controller 15 by way of a signal path 76. Both platens 66 and 67 are mounted upon an axially movable sled 77 so that barrel 52 can be selectively retracted from or moved into engagement with clamping unit 12. Axial movement of sled 77 is controlled by a hydraulic actuator 78 which is mechanically coupled to the sled and hydraulically coupled to injection control 20 by way of lines 80 and 81.

With continued reference to FIG. 1, clamping unit 12 comprises a pair of opposed clamp faces 84 and 85 which support matable sections 87 and 88 of a mold 89. Mold 89, which forms no part of the present invention, is typically supplied by the user of machine 10 and includes an interior cavity 91 whose shape defines the shape of a part produced by machine 10. Clamping unit 12 further includes a pair of hydraulic actuators 94 and 95 for selectively moving mold sections 87 and 88 into mating relation (as shown) in order to close mold 89 or to separate sections 87 and 88 in order to open mold 89. Actuators 94 and 95 are operated by hydraulic fluid supplied from clamp control 21 by way of lines 97 and 98 as shown. A distance transducer 100, which may suitably comprise a linear potentiometer, is mounted in distance sensing relation between clamp faces 84 and 85 in order to permit machine controller 15 to monitor the distance therebetween by way of a signal path 101. A conventional ejector mechanism 104 is connected to clamp control 21 via one or more hydraulic lines 105 to selectively extend one or more ejector pins 106 into cavity 91 to facilitate removal of a molded part therefrom when mold 89 is opened.

Clamping unit 12 further includes means for selectively holding mold 89 forcibly closed. While a mechanical toggle mechanism may suitably be used for this purpose, the embodiment of FIG. 1 employs hydraulic clamping whereby a piston 110 may be selectively urged against the rear of clamp face 85 under high hydraulic pressure. That pressure is developed in the interior volume 112 of a cylinder 113 which slidably receives piston 110 in hydraulically sealed relation. Interior volume 112 is selectively fluidly connected to or sealed from a prefill reservoir 116 by means of a valve 117. Valve 117 is actuated by clamp control 21 by way of a pair of lines 119 and 120. Valve 117 includes a movable valve stem 122 which is sealably engageable with a seat 123 formed in the wall of cylinder 113. After volume 112 has been filled by opening valve 117, valve 117 is closed to seal valve stem 122 against seat 123. In order to hold mold 89 clamped forcibly closed, interior volume 112 is hydraulically charged under high pressure by clamp control 21 through a hydraulic line 125 coupled to an inlet port 126 formed in the wall of cylinder 113. The hydraulic pressure within volume 112 is monitored at line 125 by a pressure transducer 128 which communicates with machine controller 15 by way of a signal path 129.

A typical operating cycle of an injection molding machine such as machine 10 comprises a number of phases including, a "clamp close" phase, an "injection" phase, an "extruder run" phase, a "clamp open" phase and an "ejection" phase. Each phase is distinct and imposes a different hydraulic demand. A sequence program within controller 15 determines the sequence, timing and quantitative values associated with those phases by outputting various operating signals 23 and 24 to electro-hydraulic controls 20 and 21 at appropriate times. Energy is conserved by regulating the output of pump 26 so as not to significantly exceed the demand associated with each phase. In accordance with the invention, further energy savings are realized by the novel use of a brushless DC motor for driving a variable displacement pump in an injection molding machine as well as by adjusting the speed of the motor in accordance with particular driving signals. In the preferred embodiment of the invention, motor 34 is a brushless DC type manufactured by Powertec of Charlotte, North Carolina and is a 75 HP version of their DPFG288T. The driving signals are calculated to not only match pump output with demand for each phase but, most preferably, also to operate the hydraulic pump/motor combination for best possible efficiency except when pump control 43 makes adjustments to effect pressure compensation or flow compensation.

In the preferred embodiment, pump 26 preferably comprises a variable displacement pump such as a vane pump or a piston pump. A preferred variable displacement pump of an axial piston, movable swash-plate design is available from Rexroth of Bethlehem, Pennsylvania as Model AA4VSO and is illustrated in further detail in FIG. 2. Pump 26 comprises a housing 133 which is capped by a port plate 134 which captures a rotatable piston assembly 136. Port plate 134 includes an inlet port 135a which connects to reservoir 30 of FIG. 1 by way of line 32 and an outlet port 135b which connects to manifold 27 and 28 as well as accumulator 48 by way of check valve 49. Piston assembly 136 comprises a cylinder barrel 137 defining cylinders which receive reciprocable pistons 138 tiltably supported by shoes 139 which slide along the face of a tilted swash-plate 140. Reciprocal movement of pistons 138 is caused by rotation of drive shaft 33 which is rotatably linked to motor 34. The angle of swash-plate 140, and therefore the stroke of pistons 138 is variable under the control of a cylinder 142 which is connected to pump control 43 by way of line 44 in a manner which will be described in further detail with reference to FIG. 3. Cylinder 142 engages swash-plate 140 in order to permit changing the tilt angle of the swash-plate in accordance with a hydraulic signal applied to cylinder 142. Cylinder 142 is oriented along an axis perpendicular to the plane of FIG. 2 to reciprocate toward and away from the viewer. That reciprocal motion effects tilting of swash-plate 140 through cam action.

Figure 2:
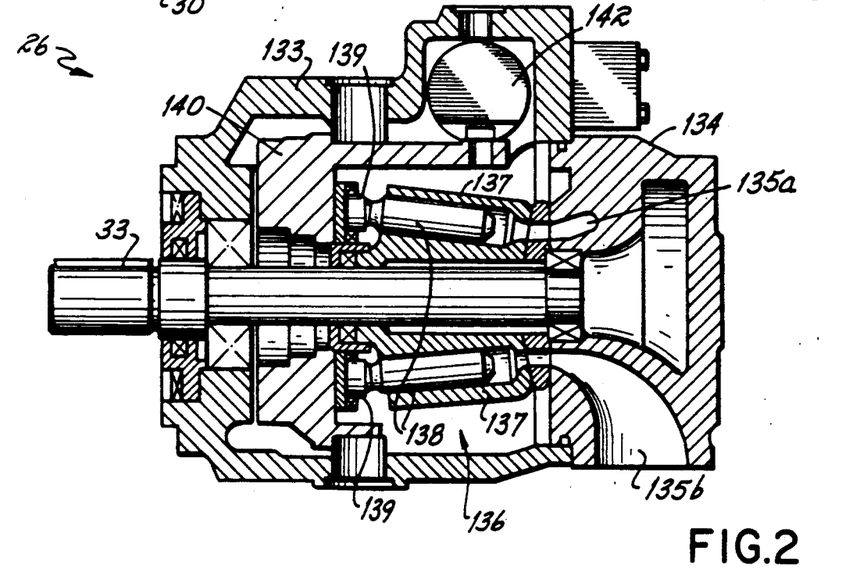
FIG. 2 is a cross-sectional view of a variable-displacement pump preferred for use as the pump shown in FIG. 1.

In operation of pump 26, rotation of shaft 33 causes pistons 138 to slide generally axially inside cylinders 137 as shoes 139 slide along the face of tilted swash-plate 140. As a piston retracts within its respective bore, hydraulic oil fills the cavity above the piston through inlet port 135a. At maximum retraction of piston 138, the piston begins to align with outlet port 135b. Continued rotation of piston assembly then extends the piston in order to discharge hydraulic fluid under pressure from port 135b. Thus, the instantaneous volume flow rate delivered by pump 26 depends on the speed of rotation of shaft 33 as well as upon the angle of swash-plate 140, the latter of which may be varied due to the action of cylinder 142 in order to selectively effect either pressure compensation or flow compensation.

Figure 3:
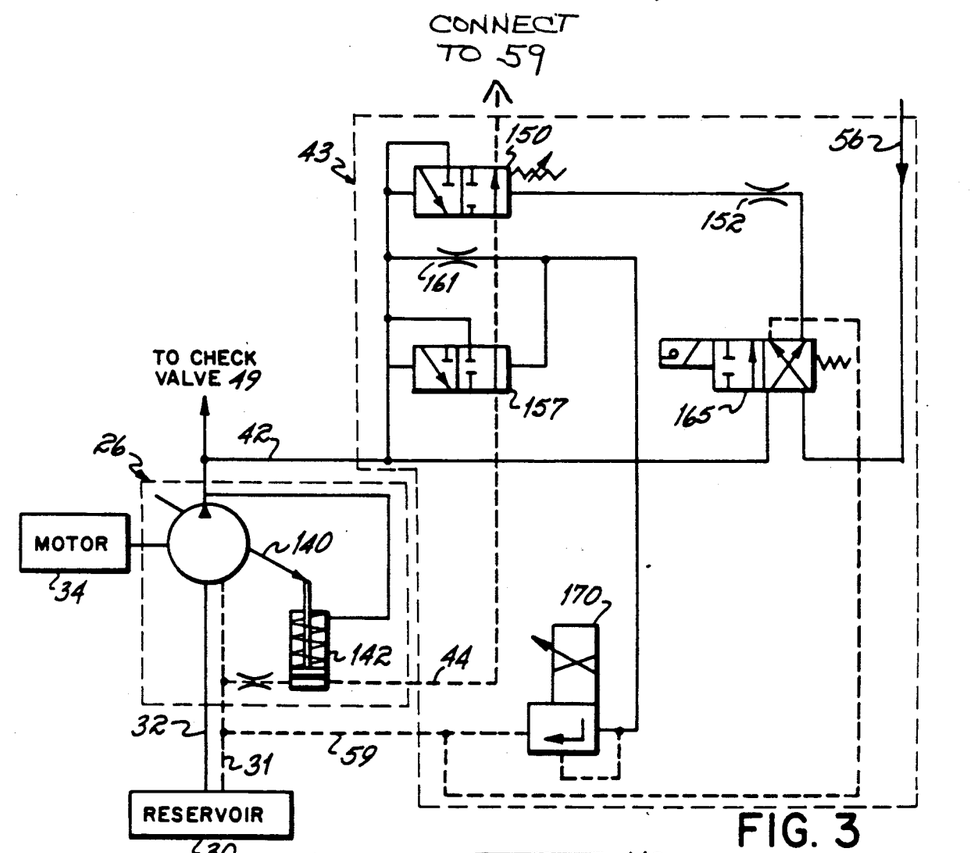
FIG. 3 is a schematic diagram illustrating the pump control of FIG. 1 in further detail.

With additional reference now to FIG. 3, pump control 43 will now be described in further detail. Pump control 43 comprises a flow compensation valve 150, a pressure compensation valve 157, an orifice 161, an electrically actuated mode selector valve 165 and an electrically settable pump pressure control valve 170, all connected as shown in FIG. 3. The high pressure output of pump 26 is connected to valve 150, 157 and 165 by way of line 42. Fluid is supplied to pump 26 from reservoir 30 by way line 32. On the low pressure side, both pump 26 and pump control 43 are connected to reservoir 30 by way of lines 31 and 59, respectively.

In order to operate pump 26 in a flow compensation mode, which is typically desired during the extruder run phase of the machine operating cycle, controller 15 applies flow compensation signal via multiple signal path 46. As a result, the spool of valve 165 shifts to the right in FIG. 3 causing pressure from line 56 to be applied to the right pilot side of valve 150 by way of an orifice 152. The output pressure from pump 26 appears by way of line 42 on the left pilot side of valve 150. As noted previously, line 56 emanates from an electrically controlled extruder motor throttle valve located inside injection control 20. In the flow compensation mode, valve 150 operates to maintain the pressure drop across that throttle at a desired constant value. That value is electrically settable by machine controller 15 in accordance with a flow compensation signal applied to the electrical input of valve 150. That flow compensation signal is applied to pump control 43 also by way of the multiple signal path 46 shown in FIG. 1.

In the event the pressure differential between the two pilots of valve 150 exceeds the electrically set desired value, the spool of valve 150 will shift toward the right in FIG. 3, thereby applying pressure to the bottom of pump cylinder 142. As FIG. 3 more clearly illustrates, cylinder 142 is mechanically coupled to tiltable swash-plate 140. Cylinder 142 includes a spring which exerts a force normally operable to maintain swash-plate 140 in a position which provides pump 26 with a maximum stroke. Because the construction of pump 26 is such that it is most efficient when operating at or near maximum stroke, it is desirable to operate the pump there whenever possible. If, however, upon the shifting of valve 150, sufficient pressure is applied via line 44 to the bottom of cylinder 142 to overcome the spring force, cylinder 142 will operate to move swash-plate 140 to shorten the stroke of the pump as necessary to restore valve 150 to its equilibrium position. Accordingly, pump 26 will deliver only the amount of fluid necessary to maintain a desired pressure drop across the throttle valve within control 20 which controls extruder motor 53.

The pressure compensation mode is selected by controller 15 during all phases of the operating cycle of machine 10 other than the extruder run phase. To do so, controller 15 deenergizes valve 165 to return it to the normal position indicated in FIG. 3 and applies a pressure compensation signal to valve 170. The pressure compensation signal is calculated by controller 15 in a manner to be described in further detail hereinafter and is applied to pump control 43 by way of multiple signal path 46 as illustrated in FIG. 1. In the pressure compensation mode, the output delivered by pump 26 is transmitted to both pilots of valve 150 thereby maintaining valve 150 in the position illustrated in FIG. 3. The output of pump 26 is also applied to the pilot on the left side of valve 157 as well as to the left side of orifice 161. The left side of orifice 161 is connected to both the right pilot of valve 157 and to the input side of valve 170. As long as the pressure at the input of valve 170 does not exceed the desired value presented to valve 170 in the form of the pressure compensation signal from controller 15, no flow passes through valve 170. As a result, there is no flow through orifice 161 and the pump output pressure appears equally at both pilots of valve 157, thereby maintaining valve 157 in the normal position illustrated in FIG. 3. During that time, the spring within valve 142 will maintain the swash-plate 140 of pump 26 in a position to provide nearly maximum stroke for most efficient operation.

In the event that the pump output pressure appearing by way of line 42 through orifice 161 to the input (right) side of valve 170 exceeds the pressure compensation value applied to valve 170, valve 170 will begin to discharge to reservoir 30 via lines 59 and 31. That flow will cause a pressure drop to appear across orifice 161, thereby causing valve 157 to shift rightwardly. As a result of that shift, valve 157 connects line 42 with line 44, thereby supplying hydraulic fluid pressure to the bottom of cylinder 142. When that pressure is sufficient to overcome the spring within cylinder 142, pump 26 is destroked in the manner described previously. The output of pump 26 will thereby be reduced tending to decrease the pressure drop across orifice 161 until the pressure appearing at the input of valve 170 no longer exceeds the pressure compensation value. Valve 170 then stops the flow to reservoir 30 and valve 157 is restored to the normal position illustrated in FIG. 3. Accordingly, in the pressure compensation mode, pump 26 delivers only the amount of flow necessary to maintain the desired pressure indicated by the pressure control signal controller 15 provides to valve 170.

Desired molding parameters expressed as setpoints in engineering units are entered into the memory of controller 15 by an operator through operator interface 16. In the preferred embodiment, controller 15 is a CAMAC XTL controller manufactured by Cincinnati Milacron, Plastics Division of Batavia, Ohio. The method for entering molding parameters into this controller is detailed in Vista Hydraulic-CE Users Manual, Publication No. PM-430 which is expressly incorporated herein by reference in its entirety. The CAMAC XTL has default values for all the setpoints in the machine for a standard machine cycle. All setpoints that can be accessed by the operator are displayed in menus 11–28 of the above-reference manual.

Controller 15 includes a program which converts each setpoint from engineering units into machine units which represent the values of the output signals generated by controller 15. Those signals include the operating signals delivered to electro-hydraulic controls 20 and 21 by way of signal paths 23 and 24, the pressure and flow compensation signals delivered to pump control 43 by way of signal path 46 and the driving signal 40 delivered to the drive of motor 34. The signal values are calculated by controller 15 from the flowrates necessary for machine operation during a phase. For example, the flowrate required to effect an injection velocity of 15 inches per second is computed by the formula:

$$F = \frac{in}{15\,s} \times \frac{1\,gal}{231\,in^3} \times A\,in^2 \times \frac{60\,s}{min}$$

where 15 is the setpoint, F is the flowrate in gallons per minute (GPM), A is the area of the actuator to be moved and the remaining terms are conversion factors. The required signal value (e.g., voltage) is then calculated as a linear proportion of the ratio of calculated flowrate to maximum flowrate. To continue the example, the voltage to the valve should be:

$$V = \frac{D_{cal}}{D_{max}} \times V_{max}$$

where $D_{cal}$ is the calculated flowrate F, $D_{max}$ is the maximum displacement of pump 21 and $V_{max}$ is the voltage which drives the appropriate control valve fully open. As is well known in the field the calculated voltages are preferably adjusted by offset values to account for leakages and other small losses in the machine. Once each signal value is calculated, it is stored in the program sequence memory of controller 15. It is important to note that the value of a given signal is calculated and the value calculated for each phase is stored in the sequence memory in a location selected to cause the appropriate signal value to be output from controller 15 during the corresponding phase.

Once all setpoints have been converted into machine units, the sequence program memory of controller 15 contains all signal values needed to sequence the machine through each phase of a complete injection molding cycle. To sequence the machine through an injection molding cycle, controller 15 outputs the various signal values from sequence program memory in appropriate sequence and time relation.

Driving signal 40 controls the speed of motor 34 and therefore the output of pump 26 to ensure the pump delivers only the flow needed for setpoint performance to meet the hydraulic demand imposed during each phase of the machine cycle in accordance with the molding parameters entered by an operator. To compute the driving signal, the calculated required flowrates for each phase are related to the maximum voltage to operate motor 23 at full speed. For example, after calculating the flowrate as discussed above, the driving signal required to drive motor 34 is calculated according to the formula:

$$V_{drive} = \frac{D_{cal}}{D_{max}} \times V_{max}$$

When $D_{cal}$ is the setpoint converted flowrate, $D_{max}$ is the maximum pump displacement and $V_{max}$ is now the voltage necessary to drive pump 21 at its maximum displacement. If the relationship between the drive voltage and pump output is not linear, a calibration table containing precise linear adjustment factors would be entered into the memory of controller 25 to correct the calculated driving signal values. The driving signals for each phase are then stored in sequence program memory with the valve machine parameters for execution by controller 15 as explained above.

Once controller 15 outputs operating signal values from the program sequence memory to controls 20 and 21, controller 15 monitors the response of clamping unit 12 or injection unit 11 to insure the setpoint has been achieved. To do so, controller 15 first reads the value of a feedback signal 18 from a transducer associated with the control action. For example, pressure transducer 72 is coupled to hydraulic line 70 leading to screw actuators 63 and 64. To verify an injection pressure, controller 15 reads the signal from pressure transducer 72 to confirm the actual pressure in the line 70 corresponds to the desired pressure. If the signal from pressure transducer 72 indicates too much or too little pressure, then controller 15 varies the injection operating signal to injection control 20 to reduce or increase the flow through the valve within the circuit. Pressure transducer 128 is provided to monitor clamping pressure in an analogous manner. Likewise, distance transducers 75 and 100 permit controller 15 to effect closed-loop control over injection velocity and clamp position, respectively.

Figure 4:
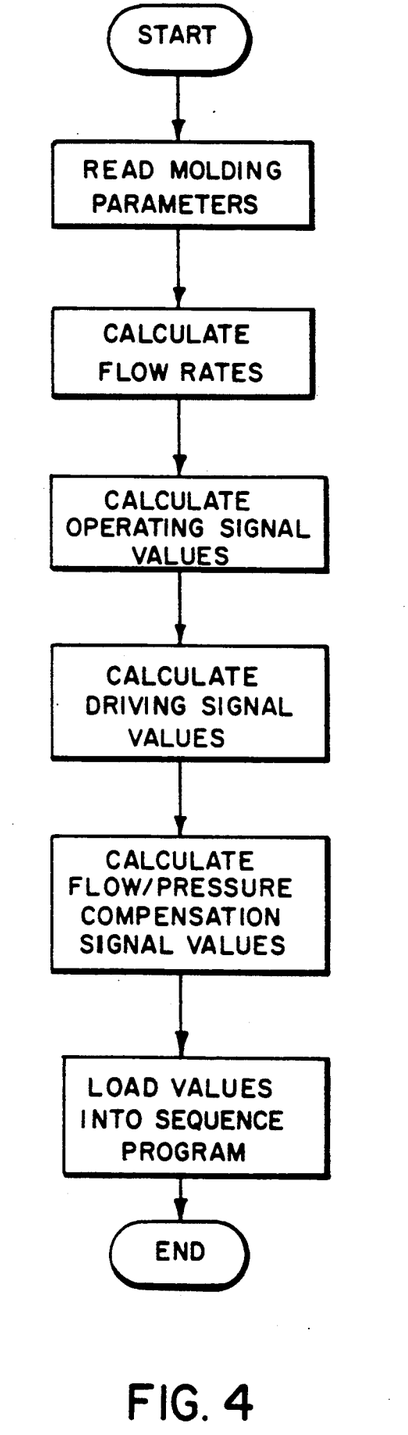
FIG. 4 is a flow diagram illustrating the manner in which the controller of FIG. 1 derives a motor driving signal.

A flowchart depicting the generation of the signal values for machine 10 by controller 15 is shown in FIG. 4. The first block shows the entry of the molding parameters for the various phases to the memory of controller 15 through operator interface 16. This procedure is performed according to the manual previously incorporated into this application.

For each molding parameter, a program within controller 15 calculates the pump flow rate, second block of FIG. 4, required to achieve the molding parameter. This calculation is performed in accordance with the formula for $D_{cal}$ previously discussed above.

Using the calculated flow rate, the program performs the third block of FIG. 4 which is the calculation of the operating signal values. These values correspond to operating signals 23 and 24 delivered to injection and clamp controls 20 and 21 to control the values within these controls.

In a similar fashion, the program uses the calculated flow rate to perform the fourth block of FIG. 4, Calculate Driving Signal Values. The program determines the magnitude of driving signal 40 necessary to drive motor 34 at the correct speed for powering pump 26 to achieve the calculated flow rate. This calculation can be adjusted by use of a calibration table for piecewise linear correction as previously discussed if needed.

Block five of FIG. 4 requires the use of the calculated flowrate and an appropriate pressure limit factor. This factor is part of the program and preferably is a few hundred psi (pounds per square inch) above the pressure generated at the calculated flowrate. The summation of the calculated flowrate pressure and pressure limit factor yields the value of the pressure compensation signal output to valve 170 for pressure compensation. A signal value for shifting mode selector valve 165 to the pressure compensation mode is also generated.

Likewise, the portion of the program which implements block five of FIG. 4 also calculates the flow compensation value using the calculated flowrate and a flow limit factor of a few hundred psi. A signal value for setting mode selector valve 165 in the flow compensation mode is also generated.

In block 6 of FIG. 4, the program stores all the generated values to the program sequence memory. Controller 15 outputs the appropriate signals corresponding to these values to cycle machine 10 through an injection molding cycle.

In operation, a typical machine operating cycle is made of a number of distinct phases, each of which normally requires different hydraulic pressures and/or flow. These phases include: clamp close, injection, extruder run, clamp open and ejector phases.

In operation, machine 10 sequentially executes a number of successive phases under the direction of controller 15. The first phase typically executed is the clamp close phase. Machine controller 15 retrieves the driving signal value for motor speed from its program sequence memory and output it as driving signal 40 to motor 34. Motor 34 varies its speed to conform to driving signal 40 and rotate its output shaft 33 at the commanded speed. This rotational output drives pump 26 to provide the flowrate calculated for the close clamp phase. The flow from pump 26 travels through manifolds 28 and 27 to injection and clamp controls 20 and 21. Controller 15 also retrieves the pressure/flow compensation signal values and outputs flow/pressure compensation signals to pump control 43. These signals put pump control 43 in a pressure compensation mode and set the appropriate pressure into valve 170.

In conjunction with the output of driving signal 40, machine controller 15 also retrieves operating signal values for the proportional control of valves within injection and clamp controls 20 and 21. The operating signals output to injection control 20 along multi-signal path 2 close all valves in injection control 20 since no movement of injection mechanical components during this phase is required.

Operating signals for clamp control 21 from machine controller 15 reach clamp control 21 over path 24 and set the proportional control of the clamp close valve. When open, this valve permits hydraulic flow from manifold 28 to enter line 97. This flow through line 97 pushes hydraulic actuators 94 and 95 toward their fixedly mounted ends. This movement forces the hydraulic fluid behind the actuators through line 98 to reservoir 30. As they traverse, actuators 94 and 95 pull rear clamp face 85 toward front clamp face 84. Rear mold section 88 coupled to rear clamp face 85 mates with front clamp section 87 attached to front clamp face 84 to close mold 89.

As rear clamp face 85 approaches front clamp face 84, controller 15 monitors the distance traversed by clamp face 85 by a signal from distance transducer 100 by way of signal path 101. As rear clamp face 85 nears front clamp face 84, controller 15 outputs operating signals to vary the proportional control of the clamp close valve within clamp control 21 to gradually close the valve. This slows the movement of rear clamp face 85 towards front clamp face 84 and protects mold 89 from impact damage.

To build and hold a pressure for holding clamp face 84 and 85 together, machine controller 15 retrieves another driving signal value and outputs a new driving signal to motor 34. This signal drives pump 26 at the necessary flowrate for building the clamp holding pressure. Likewise, controller 15 outputs new flow/pressure compensation signals to adjust the pressure compensation mode of pump control 43 to the new flowrate.

Machine controller 15 now outputs an operating signal to clamp control 21 through path 24 to open a clamp holding valve. As the clamp holding valve opens, the flow of hydraulic fluid from pump 26 through manifold 28 flows through line 119 to clamp drain valve 117 which evacuates the valve through line 120 to reservoir 30. Valve stem 122 is pulled into valve seat 123 by valve 117.

Machine controller 15 now retrieves another operating signal value and outputs an operating signal to clamp control 21 through path 24 to open the clamp pressure valve within control 21. The clamp pressure valve permits hydraulic fluid to flow from pump 26 to volume 112 through inlet port 126 of cylinder 113. This fluid flow generates pressure within volume 112 pushing piston 110 and clamp cylinder 113 apart. This pressure also secures valve stem 122 in valve seat 123. Machine controller 15 reads the pressure generated within volume 112 from pressure transducer 128 through signal line 129. When the pressure indicated from pressure transducer 128 has reached a predetermined level previously entered by the operator, machine controller 15 closes the clamp pressure valve to hold the fluid in volume 112. To do this, controller 15 outputs an operating signal through path 24 to the clamp pressure valve within clamp control 21. The pressure exerted by the fluid within volume 112 maintains the pressure to hold the clamp and mold together for the injection and cooling phase of the machine cycle without requiring additional flow from pump 26.

The next phase executed is the injection phase. Machine controller 15 retrieves a new driving signal value from its program sequence memory and outputs a driving signal 40 to motor 34 to alter the motor speed and vary the pump output to match expected flow demand. Machine controller 15 also reads the flow/pressure compensation signal values and outputs the corresponding flow/pressure compensation signals to pump control 43. Since the valves in clamp control 21 were closed by operating signals from machine controller 15 at the close of the clamp close cycle, flow is not directed to clamp control 21 but rather is available for moving the injection mechanical components.

Machine controller 15 retrieves an operating signal value to proportionally control the valves in injection control 20 and passes the operating signals by path 23 to injection control 20. The first proportional valve control exerted by machine controller 15 in the injection phase opens an injection forward valve which permits hydraulic flow from manifold 27 to push against hydraulic actuator 78 through line 81. Fluid evacuating actuator 78 leaves through line 80 to reservoir 30. Actuator 78 pushes injection unit 11 towards front clamp face 84. The nozzle end 61 of barrel 60 mates within an opening in front clamp face 84. As injection unit 11 approaches front clamp face 84, machine controller 15 outputs operating signals to injection control 20 to slowly close the valve permitting hydraulic flow to actuator 78. This is done to prevent injection unit 11 from crashing into front clamp face 84.

Machine controller 15 now outputs a new driving signal 40 corresponding to a driving signal value in program sequence memory to motor 34. This signal changes the motor speed so pump 6 now provides the correct flow for injection of material into mold 89 at a desired rate and under a desired pressure. Controller 15 also outputs flow/pressure compensating signals to pump control 43 in accordance with the flow/pressure compensation values stored in program sequence memory.

Machine controller 15 now outputs an operating signal through path 23 to injection control 20 to open the screw forward valve. Fluid flows to actuators 63 and 64 to push injection screw 52 within barrel 60 forward toward front clamp face 84. As injection screw 52 moves forward, it expels the plasticized material previously melted within barrel 60 through nozzle 61 into volume 91 of mold 89.

The velocity of the plasticized material entering mold 89 is controlled by machine controller 15 outputting appropriate drive signals to motor 34. These drive signals vary the speed of motor 34 which correspondingly change the flow rate of pump 26. As these flow rates vary so does the force exerted against actuators 64 and 63 which are coupled to screw 52. Machine controller 15 varies these drive signals to alter the injection velocity based upon the pressure reading received from pressure transducer through line 73. The signals from pressure transducer 72 are used to confirm the proper injection velocities previously entered by the operator are being achieved. Machine controller 15 outputs an operating signal to injection control 20 to close the screw forward valve when a signal (from distance transducer 75) is received via path 76 indicating screw 52 is at the end of its traverse.

If a sprue break action has been programmed, machine controller 15 varies the pump flow by outputting a new drive signal 40 to motor 34. Controller 15 then sends operating signal to injection control 20 through path 23 to open a valve which permits hydraulic flow to reverse the movement of actuator 78. This flow will retract injection unit 11 from front clamp face 84. This action is used to prevent heat transfer from barrel 60 into mold 89. If heat transfer does not prevent the material within volume 91 from cooling then this sprue break action is usually not required.

Machine controller 15 now outputs an operating signal to injection control 20 to gradually open a valve connecting line 69 and line 70. This allows actuators 63 and 64 to respond to mechanical pressure exerted against screw 52 as will be explained below.

The next phase controller 15 executes is the extruder run and cooling phase. Controller 15 now varies the pump output by a new driving signal 40 to motor 34. Controller 15 also outputs flow/pressure compensation signals to shift mode selector valve 165 of pump control 43 leftwardly to select the flow compensation mode. Another signal is delivered to flow compensation valve 150 and indicates a predetermined flow limit.

Machine controller 15 then outputs an operating signal to a throttle valve which permits hydraulic flow through line 58 to hydraulic or extruder motor 53 and then through line 57 to reservoir 30. This motor turns injection screw 52 in response to this flow. Pellets from hopper (not shown) enter barrel 60 at this time. As they do, they encounter the turning screw 52 and the mechanical shear produced by screw 52 melts the pellets. The melted material will be pushed forward by the vanes in screw 52 towards nozzle 61 of barrel 60. As this plasticized material accumulates in the front of barrel 60, it will exert a back pressure against screw 52. Since screw 52 is no longer held in position by flow through actuators 63 and 64, the screw will retract and move actuators 63 and 64.

As machine controller 15 senses the shift in pressure from actuators 63 and 64 through pressure transducer 72 along path 73, it exerts operating signals to the screw control valve through injection control 20, to close and hold the fluid in actuators 63 and 64. As the actuators resist this pressure exerted by the plasticized material a solid shot of plasticized material is built in barrel 60. Once the pressure reaches a predetermined level that was previously entered by the operator, machine controller 15 exerts a new operating signal to the screw control valve which reverses the flow through lines 69 and 70 to retract screw 52. Plasticized material now fills barrel 81 as screw 52 rotates. When screw 52 has traversed barrel 60, as indicated to controller 15 by distance transducer 75, controller 15 exerts a signal through path 23 to close the screw control valve within injection control 20. Another operating signal is also output to injection control 20 to close the extruder throttle valve connected to hydraulic motor 53 to stop the rotation of screw 52.

During the time that screw 52 has been retracted and rotated to create a shot of plasticized material, the material within volume 91 is cooled. As this material cools within the cavity 91 of mold 89, the injection molded part is formed.

Machine controller 15 now initiates the clamp open phase. At the beginning of this phase, machine controller 15 once again adjusts the speed of motor 34 so the proper flowrate from pump 26 is available for the clamp open phase. Flow/pressure compensation signals are also output to pump control 43 to shift flow/pressure compensation value back to pressure compensation mode. Controller also sends pump control 43 another signal to set a new pressure into valve 170 (FIG. 2).

Machine controller 15 outputs an operating signal to clamp control 21 to open the clamp hold valve. Hydraulic fluid within volume 112 now leaks from volume 112 to prefill reservoir 116 behind cylinder 113. After waiting a predetermined time, clamp control 21 receives an operating signal from machine controller 15 which opens a valve so hydraulic fluid from line 120 flows to drain valve 117 reversing the movement of valve stem 122. When valve stem 122 is pushed into volume 112, a more direct and larger diameter path is provided for the fluid within volume 112 to return to prefill reservoir 116. Once valve stem 122 has been fully extended into volume 112, machine controller 15 exerts an operating signal through path 24 to clamp control 21 to stop the flow from hydraulic line 120 to valve 117.

Machine controller 15 now outputs a new driving signal 40 and new flow/pressure compensation signals to setup pump control 43 and pump 26 for opening the clamp. With the clamp holding pressure now dissipated, machine controller 15 exerts an operating signal through path 24 to clamp control 21 to provide flow through hydraulic line 98 to actuators 94 and 95. Hydraulic line 97 drains the actuators to reservoir 30. The flow against actuators 94 and 95 pushes rear clamp face 85 and the attached rear mold section 88 away from front clamp face 84 and front attached mold section 87. Again, machine controller 15 monitors the distance moved by rear clamp face 85 through a signal received from distance transducer 100. As rear clamp face 85 approaches the end of the distance actuators 94 and 95 can traverse, machine controller 15 exerts an operating signal to clamp control 21 to slow the flow to actuators 94 and 95. This decrease will continue until flow is stopped and rear mold piece 88 is separated from front mold piece 87.

Machine controller 15 now executes the ejection phase of the cycle. After adjusting pump output and pump control, machine controller 15 exerts an operating signal through path 24 to clamp control 21 to drive ejector 106 through line 105. The ejector pushes against the part formed in mold 89 during the cooling phase and ejects it. The part falls into an area underneath the clamping unit 12. A gate (not shown) can then be opened and the formed part retrieved. Machine controller 15 then exerts an operating signal to clamp control 21 to reverse the flow to ejector 106 and retract ejector 106 to complete the machine cycle.

From the foregoing, it can be appreciated that pump control 43 in conjunction with variable displacement pump 26 provide means for providing prompt and precise control over the output of pump 26 in order to effect pressure and/or flow compensation on a selectable basis. Moreover, the invention provides means for matching of the output of pump 26 with the anticipated hydraulic demand associated with each phase of the operating cycle by adjusting the speed of motor 34 in accordance with a driving signal 40 calculated in accordance with desired molding parameters. As a result, pump 26 and motor 34 can be operated the majority of the time at or near maximum efficiency. The motor/pump combination selected for use in the preferred embodiment is most efficient when the pump operates at or near maximum stroke. However, those skilled in the art will recognize that other motor/pump combinations may be most efficient when operating in other operating regions. Accordingly, to maximum energy savings, the most efficient operating configuration for a given motor/pump combination should be selected as that in which the pump operates at all times except to correct transient perturbations.

In an alternative embodiment of the invention, pump 26 comprises a fixed displacement pump while pump control 43 is eliminated and motor 34 is selected to comprise a brushless DC motor. The speed of the motor is controlled during each phase of the machine cycle in accordance with a driving signal whose value is calculated to substantially match the flow delivered by the pump with the hydraulic demand expected during each respective phase. While the energy savings to be realized with this alternative are not as great as those possible with the preferred embodiment, improved energy efficiency as well as more precise and broader range adjustment over motor speed and therefore, pump output are obtained as compared to the variable speed AC motor fixed volume pump combinations known in the prior art.

While the invention has been described in connection with a hydraulic injection molding machine, those skilled in the art will appreciate that the invention is applicable to other hydraulically powered plastics processing machines such as hydraulic injection reaction molding machines.

What is claimed is:

1. An energy-conserving injection molding machine, comprising:
   (a) a clamping mechanism for supporting first and second sections of a mold and selectively moving said sections into parted relation to open the mold and mating relation to close the mold as well as for forcibly holding said mold closed;
   (b) an injection mechanism coupleable to said clamping mechanism and said mold for plasticizing a material and injecting the plasticized material into the mold to form a molded part;
   (c) hydraulic actuator means coupled to at least one of said clamping mechanism and said injection mechanism for operating same;
   (d) electro-hydraulic control means coupled to said hydraulic actuator means for supplying hydraulic fluid to said actuator means in response to predetermined electrical operating signals;
   (e) pump means coupled to said electro-hydraulic control means and to fluid reservoir means for supplying hydraulic fluid to said electro-hydraulic control means;
   (f) variable speed brushless DC motor means drivably coupled to said pump means for adjusting the hydraulic fluid output of said pump means in accordance with a driving signal, and
   (g) controller means for:
      (i) generating said operating signals in accordance with programmed molding parameter, sequence and timing inputs, and
      (ii) generating said driving signal in accordance with one of a plurality of stored values, each of said values being selected in accordance with the hydraulic fluid output required to be delivered by said pump means during at least a portion of a particular phase of operation of the machine in order to achieve said programmed inputs without significantly exceeding said required hydraulic fluid output.

2. The machine of claim 1 further comprising check valve means interposed between said pump means and said electro-hydraulic control means and accumulator means interposed between said electro-hydraulic control means and said check valve means.

3. The machine of claim 1 wherein said pump means comprises a fixed displacement pump.

4. The machine of claim 1 wherein said pump means comprises a variable displacement pump.

5. The machine of claim 4 further comprising:
   pump control means coupled to said controller means and to said variable displacement pump for selectively operating said pump in at least one of,
   (i) a pressure compensation mode wherein said pump delivers substantially only the amount of flow necessary to maintain a pressure determined in accordance with a pressure signal generated by said controller, and
   (ii) a flow compensation mode wherein said pump delivers substantially only the amount of flow necessary to maintain a flow determined in accordance with a pressure signal from said controller.

6. An energy-conserving injection molding machine, comprising:
   (a) a clamping mechanism for supporting first and second sections of a mold and selectively moving said sections into parted relation to open the mold and mating relation to close the mold as well as for forcibly holding said mold closed;
   (b) an injection mechanism coupleable to said clamping mechanism and said mold for plasticizing a material and injecting the plasticized material into the mold to form a molded part;

(c) hydraulic actuator means coupled to at least one of said clamping mechanism and said injection mechanism for operating same;

(d) electro-hydraulic control means coupled to said hydraulic actuator means for supplying hydraulic fluid to said actuator means in response to predetermined electrical operating signals;

(e) variable displacement pump means coupled to said electro-hydraulic control means and to fluid reservoir means for supplying hydraulic fluid to said electro-hydraulic control means;

(f) variable speed motor means drivably coupled to said pump means for adjusting the hydraulic fluid output of said pump means in accordance with a driving signal, and (g) controller means for:
  (i) generating said operating signals in accordance with programmed molding parameter, sequence and timing inputs, and
  (ii) generating said driving signal in accordance with one of a plurality of stored values, each of said values being selected in accordance with the hydraulic fluid output required to be delivered by said variable displacement pump means during at least a portion of a particular phase of operation of the machine in order to achieve said programmed inputs without significantly exceeding said required hydraulic fluid output.

7. The machine of claim 6 further comprising check valve means interposed between said variable displacement pump means and said electro-hydraulic control means and accumulator means interposed between said electro-hydraulic control means and said check valve means.

8. The machine of claim 6 wherein said variable speed motor means comprises a brushless DC motor.

9. The machine of claim 6 wherein said variable speed motor means comprises an AC motor.

10. The machine of claim 9 further comprising:
pump control means coupled to said controller means and to said variable displacement pump means for selectively operating said pump in at least one of,
  (i) a pressure compensation mode wherein said variable displacement pump means delivers substantially only the amount of flow necessary to maintain a pressure determined in accordance with a pressure signal generated by said controller, and
  (ii) a flow compensation mode wherein said variable displacement pump means delivers substantially only the amount of flow necessary to maintain a flow determined in accordance with a pressure signal from said controller.

* * * * *